United States Patent
Ye et al.

(10) Patent No.: US 8,422,764 B2
(45) Date of Patent: Apr. 16, 2013

(54) METHOD AND APPARATUS OF RECONSTRUCTING 3D IMAGE FROM 2D IMAGES

(75) Inventors: Jong Chul Ye, Daejeon-si (KR); Young Hun Sung, Hwaseong-si (KR); Dong Goo Kang, Suwon-si (KR); Jae Duck Jang, Daegu-si (KR); Ji Young Choi, Bucheon-si (KR); Min Woo Kim, Daegu-si (KR)

(73) Assignees: Samsung Electronics Co., Ltd., Suwon-Si (KR); Korea Advanced Institute of Science and Technology, Daejeon (KR)

( * ) Notice: Subject to any disclaimer, the term of this patent is extended or adjusted under 35 U.S.C. 154(b) by 859 days.

(21) Appl. No.: 12/585,964

(22) Filed: Sep. 29, 2009

(65) Prior Publication Data

US 2010/0124368 A1    May 20, 2010

(30) Foreign Application Priority Data

Nov. 17, 2008    (KR) ......................... 10-2008-0113839

(51) Int. Cl.
*G06K 9/00*    (2006.01)
(52) U.S. Cl.
USPC ....................................................... 382/154
(58) Field of Classification Search ................. None
See application file for complete search history.

(56) References Cited

U.S. PATENT DOCUMENTS

| | | | |
|---|---|---|---|
| 7,983,463 B2 * | 7/2011 | Sirohey et al. | 382/131 |
| 8,229,201 B2 * | 7/2012 | Licato | 382/131 |
| 2006/0210131 A1 * | 9/2006 | Wheeler et al. | 382/128 |
| 2008/0234578 A1 * | 9/2008 | Claus | 600/437 |
| 2009/0161978 A1 * | 6/2009 | Karanovic | 382/260 |

FOREIGN PATENT DOCUMENTS

| | | |
|---|---|---|
| KR | 10-2006-0085310 | 7/2006 |
| KR | 10-2006-0120511 | 11/2006 |
| KR | 10-2007-0005036 | 1/2007 |
| KR | 10-2007-0051758 | 5/2007 |
| KR | 10-2007-0077093 | 7/2007 |
| KR | 10-2007-0100178 | 10/2007 |
| KR | 10-0825048 | 4/2008 |

* cited by examiner

*Primary Examiner* — Vikkram Bali
(74) *Attorney, Agent, or Firm* — Staas & Halsey LLP

(57) ABSTRACT

An apparatus and method of reconstructing a three-dimensional (3D) image from two-dimensional (2D) images are disclosed. Three dimensional (3D) data may be reconstructed in an x-ray generation tube at a limited angle, and repeatedly updated for each pixel. A median from among each pixel of reconstruction data may be selected. Backprojecting may be performed using a search direction weight calculated using a reprojection image and residual image. A 3D image satisfying a Level 1 (L1) norm fidelity and sparsity constraint of the reconstruction data may be reconstructed.

19 Claims, 3 Drawing Sheets

METHOD AND APPARATUS OF RECONSTRUCTING 3D IMAGE FROM 2D IMAGES

CROSS-REFERENCE TO RELATED APPLICATIONS

This application claims the priority benefit of Korean Patent Application No. 10-2008-0113839, filed on Nov. 17, 2008, in the Korean Intellectual Property Office, the disclosure of which is incorporated herein by reference.

BACKGROUND

1. Field

Exemplary embodiments relate to a method and apparatus of reconstructing a three-dimensional (3D) image from two-dimensional (2D) images.

2. Description of the Related Art

Physical limits exist when measuring data for biological imaging in an x-ray tomosynthesis. Accordingly, a high spatial resolution and a temporal resolution may not be simultaneously obtained. Also, there may be trade-off relationship between spatial and temporal resolutions.

In Nyquist sampling, which is a signal processing theory in a conventional art, a number of pieces of measured data of a region of interest is required to be greater than the number of signals to be restored for a high spatial resolution. Also, measurement data, obtained at a speed two times faster than a movement speed of an object for imaging, is required for a high temporal resolution. Accordingly, a high spatial resolution may not be obtained in many cases.

In an x-ray tomosynthesis, a reconstruction method based on a signal processing theory in a conventional art may be performed when the number of pieces of measured data is equal to or greater than the number of data of an object to be reconstructed. Briefly, the shift-and-add method with respect to pixels of projected images may be used. Here, the pixels of projected images may correspond to three-dimensional (3D) pixels of an object along x-ray directions.

In an x-ray tomosynthesis, a movement angle of an x-ray generation tube may be limited according to physical characteristics of an object. In this case, when an object with high contrast exists and projected images are backprojected, a dim ghost image of the object with high contrast may be generated in tomosynthesis images. That is, since image information obtainable by Nyquist sampling that is required for exact reconstruction of an original image may not be provided with a limited movement angle of an x-ray generation tube, a ghost image may occur.

In a Nyquist sampling theory, which is a fundamental background of an information theory and a signal processing theory in a conventional art, possibility of exact reconstruction may be determined based on only a size of an original image.

SUMMARY

Exemplary embodiments may provide an apparatus for reconstructing a three-dimensional (3D) image from two-dimensional (2D) images which may remove interference by an object in another location, and process an image using a nonlinear filtering method based on a median, and thus a noise reduction effect may be improved in comparison to a linear filtering method.

Exemplary embodiments may also provide a method and apparatus for reconstructing a 3D image from 2D images which calculates a small number of projected images in x-ray tomosynthesis, and thus calculation may be efficiently performed.

Exemplary embodiments may also provide an apparatus for reconstructing a 3D image from 2D images which is based on a signal characteristic of measured data and reconstruction data and energy distribution of an x-ray generation tube, and thereby may improve a performance.

According to exemplary embodiments, there may be provided a method of reconstructing a three-dimensional (3D) image from two-dimensional (2D) images, the method including: backprojecting using a pixel value corresponding to a median, from among pixel values of images where a 3D reconstruction object is two-dimensionally projected for each pixel, and generating an 3D reconstruction image, reprojecting the 3D reconstruction image and generating a 2D reprojection image; and constructing residual images, generated due to a difference between the 2D reprojection image and each of the images where the 3D reconstruction object is two-dimensionally projected, based on a predetermined search direction weight, wherein the residual images are used to reconstruct the three-dimensional (3D) image, and wherein the method is performed using at least one processor.

In this instance, the method may further include: repeating the reprojecting of the 3D reconstruction image and the generating of the 2D reprojection image, and repeating the reconstructing of the residual images generated due to the difference between the 2D reprojection image and each of the images where the 3D reconstruction object is two-dimensionally projected.

When the search direction weight is calculated based on the residual images and the 2D reprojection image, and the calculated search direction weight satisfies a predetermined cost function, the repeating may repeat the reconstructing of the residual images through updating.

The method may further include: discontinuing the reconstructing of the residual images, when a sum of the residual images or a difference between the residual images is equal to or less than a predetermined threshold value and obtaining the reconstructed three-dimensional (3D) image from the residual images.

The backprojecting and the generating 3D reconstruction image may generate data of the images where the 3D reconstruction image is two-dimensionally projected from an x-ray generation tube at a predetermined angle, update each pixel of the data, select the median, and backproject using the pixel value corresponding to the median to generate the 3D reconstruction image The reprojecting and the generating may generate the 2D reprojection image based on a weight according to energy projected from an x-ray generation tube.

The backprojecting and the generating may further include: arranging the pixel values of the images where the 3D reconstruction object is two-dimensionally projected for each pixel from a lowest value to a highest value.

The method may further include: adding a pixel value of the 3D reconstruction object to the arranged pixel values using a Lagrangian parameter and arranging, when a number of the arranged pixel values is less than a predetermined number.

The search direction weight may be a weight according to energy distribution, and may be calculated depending on a type of an x-ray.

According to exemplary embodiments, there may be provided an apparatus for reconstructing a 3D image from 2D images, the apparatus including: an image reconstruction unit to backproject using a pixel value corresponding to a median, from among pixel values of images where a 3D reconstruction object is two-dimensionally projected for each pixel, and to generate a 3D reconstruction image; a reprojection image generation unit to reproject the 3D reconstruction image and generate a 2D reprojection image, wherein the image reconstruction unit includes at least one processor to backproject using the pixel value and to generate the 3D reconstruction image; and a residual image construction unit to construct residual images, generated due to a difference between the 2D reprojection image and each of the images where the 3D reconstruction object is two-dimensionally projected, based on a predetermined search direction weight, wherein the residual images are used to reconstruct the three-dimensional (3D) image.

The reprojection image generation unit may repeat the reprojecting of the 3D reconstruction image and the generating of the 2D reprojection image, and the residual image construction unit may repeat the reconstructing of the residual images generated due to the difference between the 2D reprojection image and each of the images where the 3D reconstruction object is two-dimensionally projected.

When the search direction weight is calculated based on the residual images and the 2D reprojection image, and the calculated search direction weight satisfies a predetermined cost function, the residual image construction unit may repeat the reconstructing of the residual images through updating.

The residual image construction unit may discontinue the reconstructing of the residual images when a sum of the residual images or a difference between the residual images is equal to or less than a predetermined threshold value and may obtain the reconstructed three-dimensional (3D) image from the residual images.

The reconstruction image generation unit may generate data of the images where the 3D reconstruction image is two-dimensionally projected from an x-ray generation tube at a predetermined angle, update each pixel of the data, select the median, and backproject using the pixel value corresponding to the median to generate the 3D reconstruction image.

The reprojection image generation unit may generate the 2D reprojection image based on a weight according to energy projected from an x-ray generation tube.

The reconstruction image generation unit may arrange the pixel values of the images where the 3D reconstruction object is two-dimensionally projected for each pixel from a lowest value to a highest value.

The reconstruction image generation unit may add a pixel value of the 3D reconstruction object to the arranged pixel values using a Lagrangian parameter and arranging, when a number of the arranged pixel values is less than a predetermined number.

The search direction weight may be a weight according to energy distribution, and may be calculated depending on a type of an x-ray.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects, features, and advantages of exemplary embodiments will become apparent and more readily appreciated from the following description, taken in conjunction with the accompanying drawings of which.

DETAILED DESCRIPTION

Figure 1:
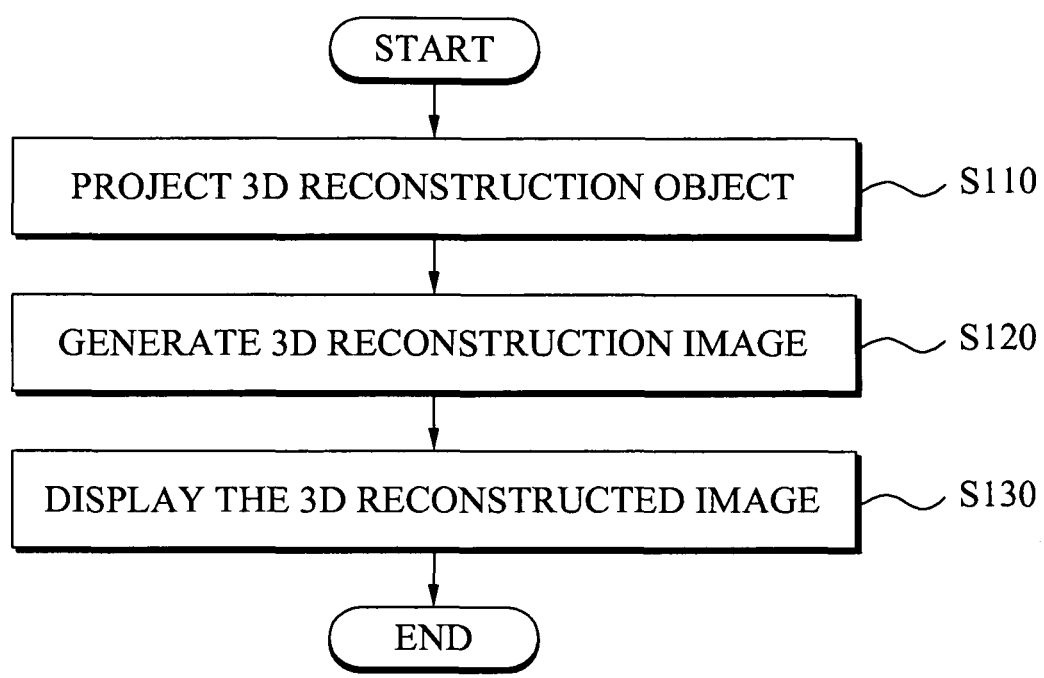
FIG. 1 is a flowchart illustrating a method of reconstructing a three-dimensional (3D) image from a two-dimensional (2D) image according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a flowchart illustrating a method of reconstructing a three-dimensional (3D) image from two-dimensional (2D) images according to exemplary embodiments. The method of reconstructing a 3D image from 2D images is described in detail with reference to FIG. 1.

In operation S110, a 3D reconstruction object may be projected from an x-ray generation tube rotating within a limited angle.

In operation S120, a 3D image may be reconstructed from the projected image. The 3D reconstruction image may satisfy a Level 1 (L1) norm constraint including sparsity and fidelity. In operation S130, the 3D reconstructed image may be displayed.

For example, a projected image of a 3D object may be obtained using an x-ray Computerized Axial Tomography (CAT), and an L1 norm optimization solution may be obtained using the projected image to reconstruct the 3D image. Here, the L1 norm optimization solution may satisfy L1 norm fidelity and sparsity of a reconstruction object.

An image projected from the x-ray generation tube may be stored as a vector. The vector may be identical to a sum of discrete 3D pixels of the 3D object. Here, rays emitted from the x-ray generation tube passes through the 3D object.

In a conventional art, a shift-and-add operation may be applied to a set of pixels of projected images. Here, the pixels of projected images may correspond to each pixel of an object to be restored. The shift-and-add operation may satisfy a solution to optimize an L2 norm of 3D reconstruction data. However, when a number of pieces of measured data is less than a number of pieces of 3D data, an original signal may not be accurately restored.

Accordingly, when a constraint of the 3D reconstruction data includes sparsity and L1 norm data fidelity, based on a compressed sensing theory, a more accurate solution may be obtained by using a method of obtaining a solution to optimize an L1 norm.

Figure 2:
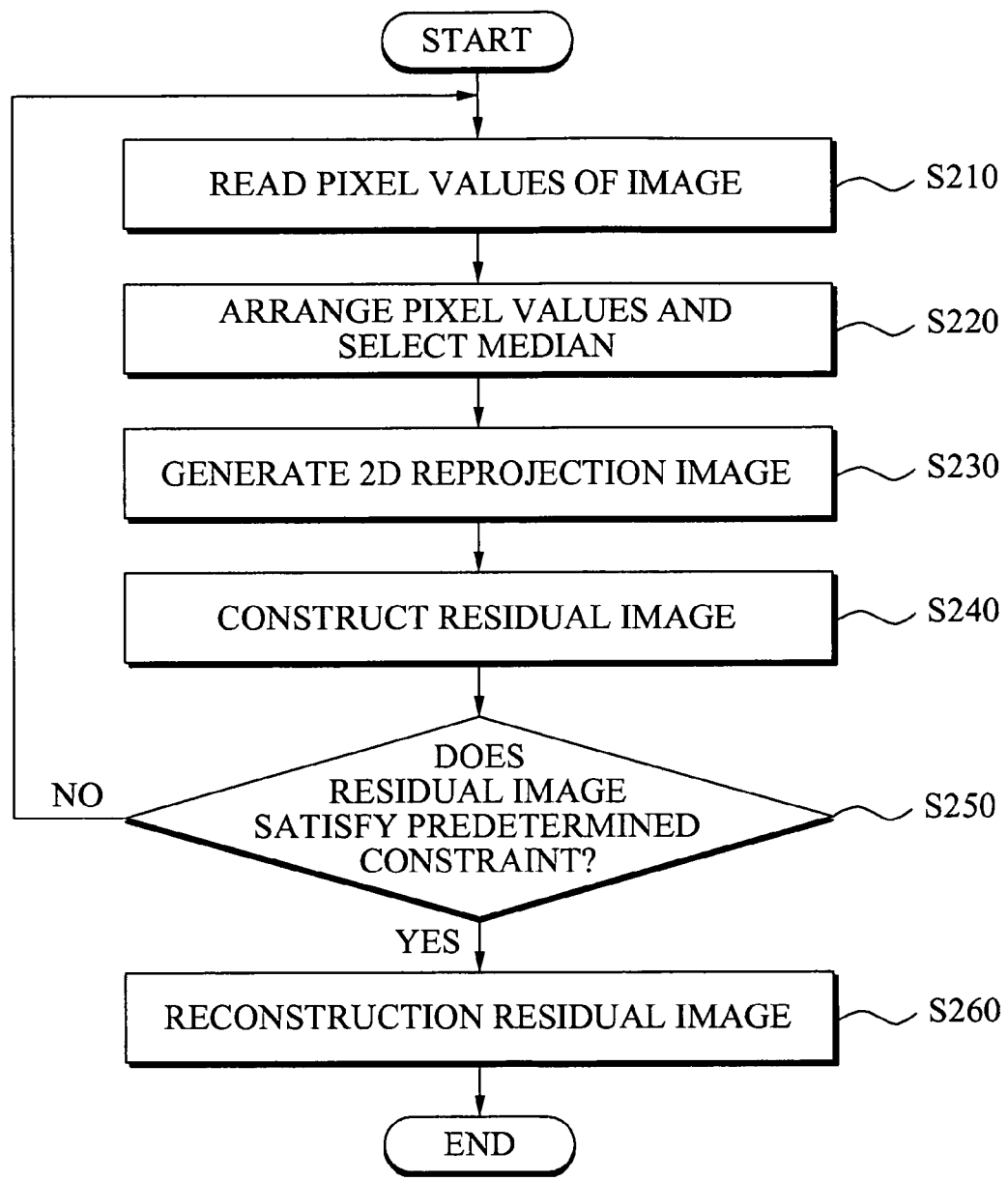
FIG. 2 is a flowchart illustrating a method of obtaining a Level 1 (L1) norm optimization solution including constraints of sparsity and L1 norm data fidelity according to exemplary embodiments.

FIG. 2 is a flowchart illustrating a method of obtaining an L1 norm optimization solution including constraints of sparsity and L1 norm data fidelity according to exemplary embodiments.

According to exemplary embodiments, an apparatus for reconstructing a 3D image from 2D images, hereinafter, an apparatus, may backproject using a pixel value corresponding to a median, from among pixel values of images where a 3D reconstruction object is two-dimensionally projected for each pixel, and thereby may generate a 3D reconstruction image.

In operation S210, the apparatus may read the pixel values of the projection images corresponding to each pixel of the 3D reconstruction object.

In operation S220, the apparatus may arrange the pixel values, and select the median from among the arranged pixel values.

In this instance, the apparatus may arrange the pixel values of the images where the 3D reconstruction object is two-dimensionally projected for each pixel from a lowest value to a highest value. Also, when a number of the arranged pixel values is less than a predetermined number, the apparatus may add a pixel value of the 3D reconstruction object to the arranged pixel values using a Lagrangian parameter to arrange.

In operation S230, the apparatus may generate the 3D reconstruction image by backprojecting the median to the 3D reconstruction object, reproject the 3D reconstruction, and thereby may generate a 2D reprojection image.

In this instance, the apparatus may generate data of the images where the 3D reconstruction image is two-dimensionally projected from an x-ray generation tube at a predetermined angle, update each pixel of the data, and select the median. Also, the apparatus may backproject using the pixel value corresponding to the median, and thereby may generate the 3D reconstruction image. Also, the 2D reprojection image may be generated based on a weight according to energy projected from the x-ray generation tube.

In this instance, the weight may be a weight according to energy distribution, and be calculated depending on a type of an x-ray.

In operation S240, the apparatus may construct residual images. The residual images may be generated due to a difference between the 2D reprojection image and each of the images where the 3D reconstruction object is two-dimensionally projected, based on a predetermined search direction weight.

In operation S250, the reading in operation S210, the selecting in operation S220, the generating in operation S230, and the constructing in operation S240 may be repeated depending on whether the residual image satisfy a predetermined constraint. In operation S260, the apparatus may reconstruct the residual image.

Specifically, the reconstructing of the residual images may be repeated depending on the difference between the 2D reprojection image and each of the images where the 3D reconstruction object is two-dimensionally projected.

For example, when the search direction weight is calculated based on the residual images and the 2D reprojection image, and the calculated search direction weight satisfies a predetermined cost function, the apparatus may repeat the reconstructing of the residual images through updating.

Also, when a sum of the residual images or a difference between the residual images is equal to or less than a predetermined threshold value, the apparatus may discontinue reconstructing of the residual images.

Thus, according to exemplary embodiments, since a median of each of the projected images corresponding to 3D pixels to be restored may be backprojected, a solution to an L1 norm optimization may be obtained. Also, a reprojection image may be calculated using the backprojected image, and thus the residual images may be calculated.

Specifically, in an image reconstruction method which provides compressed measurement data, when an object to be restored has L1 norm fidelity, a median may be an L1 norm optimization solution regardless of a number of pieces of candidate data.

Also, a search direction weight may be calculated using a reprojection image and residual images filled with an initial estimated value. Accordingly, the residual images may be updated to satisfy a predetermined cost function and have a quick convergence performance.

When the sum of residual images is equal to or less than the threshold value, or when the difference between the residual images is equal to or less than the threshold value, the repeating may be discontinued and a reconstructed 3D image may be obtained.

A relationship between the images projected from the x-ray generation tube and a discrete pixel of the 3D reconstruction object may not be a bijection relationship. In this instance, each pixel may be associated with at least one pixel. Accordingly, since the projected image may not be clear, a relationship among each of the pixels is required to be taken into account according to a hardware characteristic when backprojecting and projecting.

In operation S240, the residual images may be obtained based on the difference between the reprojection image and the image projected from the x-ray generation tube.

Data to be reconstructed, hereinafter, reconstruction data, with respect to the entire pixels may be simultaneously updated during the repetitions. Also, while the repeating is performed until the constraint is minimized, and either when energy of the residual images updated by repeatedly calculating the pixels of the 3D reconstruction object is equal to or less than the threshold value, or when the difference is equal to or less than the threshold value, the repeating may be discontinued.

As described above, the relationship between the projected image and the 3D pixels to be reconstructed may be given by, $$y = Hf + w \qquad \text{[Equation 1]}$$

A vector y may be measured data and a vector f may be reconstruction data, and w may be noise. A matrix H may be a matrix where each pixel of the reconstruction data f is mapped to the measured data y.

Equation 1 may be a forward problem in image reconstruction, and be defined as when calculating the reprojection image and when analyzing the projected image.

An inverse problem may indicate an operation of calculating reconstruction data f using y, measured and calculated in the forward problem.

Discretization with respect to the 2D projected image and 3D reconstruction object may be performed. The relationship between the 3D reconstruction object and projected images may be defined as Equation 1.

When a number of pieces of the measured data is identical to a number of pieces of the restored data, the matrix H may be a square matrix. When the number of pieces of the measured data is greater than the number of pieces of the restored data, the matrix H may more rows than columns. When the number of pieces of the measured data is less than the number of pieces of the restored data, the matrix H may have less rows than columns.

According to exemplary embodiments, a physical environment and theoretical background may be taken into account when the number of pieces of the measured data is less than the number of pieces of the restored data.

$$\min_{f} \|y - Hf\|_2^2 + \lambda \|f\|_1^2 \qquad \text{[Equation 2]}$$

In Equation 1, defined as the relationship between the reconstruction data and measured data, a shift-and-add operation may be a solution to an L2 norm optimization. The shift-and-add operation may be a solution to differentiate and calculate, based on the reconstruction data f to enable the cost function to be minimized by the reconstruction data f based on only the first term $\|y-Hf\|_2^2$ Equation 2.

However, the shift-and-add operation may be associated with when the number of pieces of the measured data is greater than the number of pieces of the restored data. That is, when the number of pieces of the measured data is less than the number of pieces of the restored data, for example, as with an x-ray image tomosynthesis, a case when the reconstruction data f has sparsity may be taken into account. Accordingly, a constraint that the reconstruction data f has sparsity may be used as an unconstraint using a Lagrangian parameter, and the shift-and-add operation may be defined as Equation 2.

$$\min_{f} \|y - Hf\|_1 + \lambda \|f\|_1 \qquad \text{[Equation 3]}$$

Under the constraint that the reconstruction data f has sparsity, L1 norm fidelity data may be additionally taken into account, and the cost function may be defined using a method of optimizing an L1 norm of y−Hf which is a residual value. $\|.\|_1$ may denote the L1 norm, and $\lambda$ may denote the Lagrangian parameter. With respect to images where a candidate set of medians is projected depending on a value of the Lagrangian parameter when backprojecting, a value of 3D pixel restored in a previous repetition may be added to a set of pixels.

In Equation 2 and Equation 3, a difference where an L2 norm and an L1 norm are taken into account based on a location of the reconstruction data may be included. Accordingly, a solution may vary. Specifically, a solution to Equation 3 may be originally based on a linear programming. However, since the linear programming may consume a great amount of time, a method of updating each pixel simultaneously and repeatedly may be used, which is given by, $$\begin{aligned} \|e\|_1 &= \|y - H\hat{f}\|_1 \\ &= \|y - H_{*i} f_i - H_{*i} \Delta f_i\|_1 \\ &= \|e - H_{*i} \Delta f_i\|_1 \\ &= \sum_{n \in \chi} |e_n - H_{n,i} \Delta f_i| \end{aligned} \qquad \text{[Equation 4]}$$

When the reconstruction data f is based on L1 norm fidelity in Equation 3, Equation 4 may be used.

$\chi$ may be identical to a number of projected images. Each term defined as the L1 norm may be represented as an absolute value of each term according to the definition of the L1 norm.

When a method of updating each pixel is simultaneously applied to all the pixels to embody the method of updating all the pixels simultaneously and repeatedly, the reconstruction data f may update $\Delta f_i$ in an initial estimation value $f_i$ at each iteration.

An error 3 may be defined as an L1 norm based on the L1 norm fidelity. Also, the cost function, defining an extension to each of the projected images, may be determined to reduce a pixel value $\Delta f_i$ of the reconstruction object.

$$C(\Delta f_i) = \sum_{n \in \chi} |e_n - H_{n,i} \Delta f_i| + \lambda |f_i + \Delta f_i| + const \qquad \text{[Equation 5]}$$

When the defined L1 norm is applied to Equation 3, and the L1 is defined with respect to all the projected images up to $\chi$ times, the cost function $C(\Delta f_i)$ may be defined.

The cost function $C(\Delta f_i)$ may be defined as the L1 norm. In a method of backprojecting the median of each term to obtain a solution to optimize $\Delta f_i$ cost function $C(\Delta f_i)$, a previously updated data value may be added to a candidate set of medians to be backprojected depending on a value of the Lagrangian parameter.

$$S = \{-f_i\} \cup \left\{\frac{e_n}{H_{n,i}}\right\}_{n \in \chi} \qquad \text{[Equation 6]}$$

A solution satisfying $\Delta f_i$ where the defined cost function $C(\Delta f_i)$ is minimized may be represented as a union of every solution set of a first term of residual images using the projected images and a second term including the Lagrangian parameter.

The first term may be data updated in a previous repetition, and the second term may be a value obtained by dividing each pixel of the residual value by a value of a matrix H of each of the pixels.

$$\Delta f_i^* = \text{median}\{e_n\}_{n \in \chi} \qquad \text{[Equation 7]}$$

An update value of the reconstruction data f in the solution set S may be $\Delta f_i^*$. The update value $\Delta f_i^*$ may be a median of values of each residual image corresponding to $i_{th}$ pixel to be restored, and be an L1 optimization solution.

When contribution of the matrix H with respect to each pixel is a constant number, and an additional constraint is not taken into account, the L1 norm optimization solution may be defined as Equation 7 in the solution set S. In this instance, it may be ascertained that a median of the solution set S may minimize the cost function regardless of a value of n.

$$\begin{aligned} \hat{f}_i &= f_i + \alpha d \\ &= f_i + \alpha \begin{pmatrix} \Delta f_1^* \\ \vdots \\ \Delta f_N^* \end{pmatrix} \end{aligned} \qquad \text{[Equation 8]}$$

The update value $\Delta f_i^*$ may be in a vector direction of each pixel, and the reconstruction data f may be represented as a search direction d of the $i_{th}$ pixel, $\Delta f_i^*$, and a search direction weight $\alpha$. The updating may be simultaneously performed with respect to the entire pixels.

Total weights of a search direction of each pixel may be calculated by, $$\begin{aligned} C(\alpha) &= \|y - H\hat{f}\|_1 + \lambda \|\hat{f}\|_1 \\ &= \|e - \alpha d\|_1 + \lambda \|f + \alpha d\|_1 \\ &= \sum_{i=1}^{N} \sum_{n \in \chi} |e_n - \alpha H_{n,i} \Delta f_i| + \lambda \sum_{i=1}^{N} |f_i + \Delta f_i| \end{aligned} \qquad \text{[Equation 9]}$$

The updating method defined in Equation 8 may be applied to Equation 3, and thus a cost function may be defined. The total weights may be calculated using Equation 5 to calculate a weight $\alpha$ to minimize the cost function.

N may be identical to a total number of pixels of a reconstruction object, and $\chi$ may be identical to the number of projected images. Also, the weight α to minimize the cost function C(α) may be given by, $$A = \left\{-\frac{f_i}{\Delta f_i}\right\}_{i=1,\ldots,N} \cup \left\{\frac{e_n}{H_{n,i}\Delta f}\right\}_{n\in\chi, i=1,\ldots,N} \quad \text{[Equation 10]}$$

Both a first term, defined with respect to the entire projected images, and a second term changed to an unconstraint may be taken into account in the cost function C(α).

When obtaining the weight to enable the cost function to be minimized, for example, 0, to calculate a value of the search direction weight with respect to all the pixels used for the residual images, the weight may be the sum set of two sets in Equation 10. Accordingly, the weight of the search direction in Equation 8 with respect to all the pixels of the reconstruction material may be defined as the set A.

Figure 3:
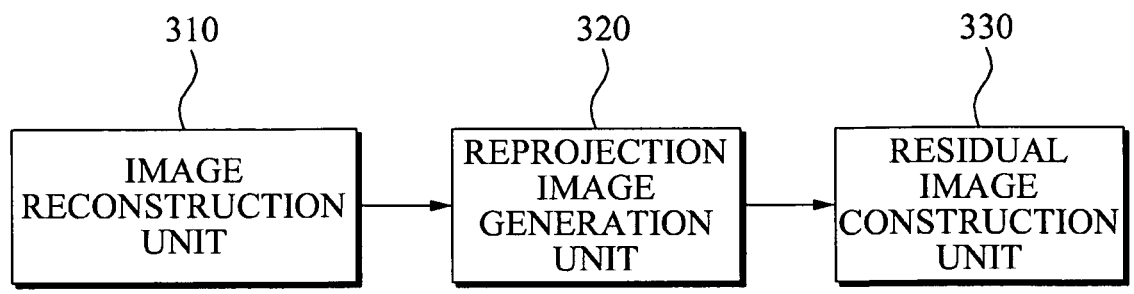
FIG. 3 is a block diagram illustrating an apparatus for reconstructing a 3D image from 2D images.

FIG. 3 is a block diagram illustrating an apparatus for reconstructing a 3D image from 2D images. The apparatus is described in detail with reference to FIG. 3.

According to exemplary embodiments, the apparatus may include an image reconstruction unit 310, a reprojection image generation unit 320, and a residual image construction unit 330.

The image reconstruction unit 310 may backproject using a pixel value corresponding to a median, from among pixel values of images where a 3D reconstruction object is two-dimensionally projected for each pixel, and generate a 3D reconstruction image.

In this instance, the image reconstruction unit 310 may generate data of the images where the 3D reconstruction image is two-dimensionally projected from an x-ray generation tube at a predetermined angle. Also, the image reconstruction unit 310 may update each pixel of the data, select the median, and backproject using the pixel value corresponding to the median to generate the 3D reconstruction image.

The image reconstruction unit 310 may arrange the pixel values of the images where the 3D reconstruction object is two-dimensionally projected for each pixel from a lowest value to a highest value.

The image reconstruction unit 310 may add a pixel value of the 3D reconstruction object to the arranged pixel values using a Lagrangian parameter to arrange, when a number of the arranged pixel values is less than a predetermined number.

The reprojection image generation unit 320 may reproject the 3D reconstruction image and generate a 2D reprojection image.

In this instance, the reprojection image generation unit 320 may generate the 2D reprojection image based on a weight according to energy projected from an x-ray generation tube.

The search direction weight may be a weight according to energy distribution, and be calculated depending on a type of an x-ray.

The residual image construction unit 330 may construct residual images, generated due to a difference between the 2D reprojection image and each of the images where the 3D reconstruction object is two-dimensionally projected, based on the predetermined search direction weight.

In this instance, the reprojection image generation unit 320 may repeat the reprojecting of the 3D reconstruction image and the generating of the 2D reprojection image. Also, the residual image construction unit 330 may repeat the reconstructing of the residual images generated due to the difference between the 2D reprojection image and each of the images where the 3D reconstruction object is two-dimensionally projected.

When the search direction weight is calculated based on the residual images and the 2D reprojection image, and the calculated search direction weight satisfies a predetermined cost function, the residual image construction unit 330 may repeat the reconstructing of the residual images through updating.

Also, the residual image construction unit 330 may discontinue the reconstructing of the residual images when a sum of the residual images or a difference between the residual images is equal to or less than a predetermined threshold value.

According to exemplary embodiments, when a signal of a reconstruction object has sparsity even though compressed measurement data is obtained, an original signal may be accurately restored.

Also, when reconstructing a 3D image from 2D images, interference to an object in another location may be removed, and an image may be processed using a nonlinear filtering method based on a median. Accordingly, a noise removal effect may be improved than a linear filtering method.

Also, since a great number of images projected from an x-ray generation tube is required in an L2 optimization based-backprojection method in a conventional art, it may be inefficient to arrange and backproject candidate values. According to exemplary embodiments, however, since an L1 optimization based-backprojection method is used, a small number of images is required, and calculation may be efficiently performed.

Also, a signal characteristic of measurement data and reconstruction data and a physical energy distribution of an x-ray generation tube may be taken into account, and thus a performance of an apparatus for reconstructing a 3D image may be improved.

Also, after the method of reconstructing a three-dimensional (3D) image from two-dimensional (2D) images according to the above-described exemplary embodiments is completed, the three-dimensional (3D) image may be displayed on a display unit.

Also, the methods according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed is:

1. A method of reconstructing a three-dimensional (3D) image from two-dimensional (2D) images, the method comprising:
   backprojecting using a pixel value corresponding to a median, from among pixel values of images where a 3D reconstruction object is two-dimensionally projected for each pixel, and generating a 3D reconstruction image;
   reprojecting the 3D reconstruction image and generating a 2D reprojection image; and
   constructing residual images, generated due to a difference between the 2D reprojection image and each of the images where the 3D reconstruction object is two-dimensionally projected, based on a predetermined search direction weight,
   wherein the residual images are used to reconstruct the three-dimensional (3D) image; and
   wherein the method is performed using at least one processor.

2. The method of claim 1, further comprising:
   repeating the reprojecting of the 3D reconstruction image and the generating of the 2D reprojection image, and repeating the reconstructing of the residual images generated due to the difference between the 2D reprojection image and each of the images where the 3D reconstruction object is two-dimensionally projected.

3. The method of claim 2, wherein, when the search direction weight is calculated based on the residual images and the 2D reprojection image, and the calculated search direction weight satisfies a predetermined cost function, the repeating repeats the reconstructing of the residual images through updating.

4. The method of claim 2, further comprising:
   discontinuing the reconstructing of the residual images when a sum of the residual images or a difference between the residual images is equal to or less than a predetermined threshold value and obtaining the reconstructed three-dimensional (3D) image from the residual images.

5. The method of claim 1, wherein the backprojecting and the generating generates data of the images where the 3D reconstruction image is two-dimensionally projected from an x-ray generation tube at a predetermined angle, updates each pixel of the data, selects the median, and backprojects using the pixel value corresponding to the median to generate the 3D reconstruction image.

6. The method of claim 1, wherein the reprojecting and the generating generates the 2D reprojection image based on a weight according to energy projected from an x-ray generation tube.

7. The method of claim 1, wherein the backprojecting and the generating further comprises:
   arranging the pixel values of the images where the 3D reconstruction object is two-dimensionally projected for each pixel from a lowest value to a highest value.

8. The method of claim 7, further comprising:
   adding a pixel value of the 3D reconstruction object to the arranged pixel values using a Lagrangian parameter and arranging, when a number of the arranged pixel values is less than a predetermined number.

9. The method of claim 1, wherein the search direction weight is a weight according to energy distribution, and is calculated depending on a type of an x-ray.

10. An apparatus for reconstructing a three dimensional (3D) image from two dimensional (2D) images, the apparatus comprising:
    an image reconstruction unit to backproject using a pixel value corresponding to a median, from among pixel values of images where a 3D reconstruction object is two-dimensionally projected for each pixel, and to generate a 3D reconstruction image, wherein the image reconstruction unit includes at least one processor to backproject using the pixel value and to generate the 3D reconstruction image;
    a reprojection image generation unit to reproject the 3D reconstruction image and generate a 2D reprojection image; and
    a residual image construction unit to construct residual images, generated due to a difference between the 2D reprojection image and each of the images where the 3D reconstruction object is two-dimensionally projected, based on a predetermined search direction weight,
    wherein the residual images are used to reconstruct the three-dimensional (3D) image.

11. The apparatus of claim 10, wherein the reprojection image generation unit repeats the reprojecting of the 3D reconstruction image and the generating of the 2D reprojection image, and the residual image construction unit repeats the reconstructing of the residual images generated due to the difference between the 2D reprojection image and each of the images where the 3D reconstruction object is two-dimensionally projected.

12. The apparatus of claim 10, wherein, when the search direction weight is calculated based on the residual images and the 2D reprojection image, and the calculated search direction weight satisfies a predetermined cost function, the residual image construction unit repeats the reconstructing of the residual images through updating.

13. The apparatus of claim 10, wherein the residual image construction unit discontinues the reconstructing of the residual images when a sum of the residual images or a difference between the residual images is equal to or less than a predetermined threshold value and obtains the reconstructed three-dimensional (3D) image from the residual images.

14. The apparatus of claim 10, wherein the image reconstruction unit generates data of the images where the 3D reconstruction image is two-dimensionally projected from an x-ray generation tube at a predetermined angle, updates each pixel of the data, selects the median, and backprojects using the pixel value corresponding to the median to generate the 3D reconstruction image.

15. The apparatus of claim 10, wherein the reprojection image generation unit generates the 2D reprojection image based on a weight according to energy projected from an x-ray generation tube.

16. The apparatus of claim 10, wherein the image reconstruction unit arranges the pixel values of the images where the 3D reconstruction object is two-dimensionally projected for each pixel from a lowest value to a highest value.

17. The apparatus of claim 16, wherein the image reconstruction unit adds a pixel value of the 3D reconstruction object to the arranged pixel values using a Lagrangian parameter and arranging, when a number of the arranged pixel values is less than a predetermined number.

18. The apparatus of claim 10, wherein the search direction weight is a weight according to energy distribution, and is calculated depending on a type of an x-ray.

19. A non-transitory computer readable recording media storing program instructions to control at least one processor to implement the method of claim 1.

* * * * *